United States Patent
Zhou

(10) Patent No.: US 11,212,771 B2
(45) Date of Patent: Dec. 28, 2021

(54) METHOD AND DEVICE FOR IMPLEMENTING PAGING MONITORING, BASE STATION AND USER EQUIPMENT

(71) Applicant: SPREADTRUM COMMUNICATIONS (SHANGHAI) CO., LTD., Shanghai (CN)

(72) Inventor: Huayu Zhou, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/902,526

(22) Filed: Feb. 22, 2018

(65) Prior Publication Data

US 2018/0368103 A1  Dec. 20, 2018

(30) Foreign Application Priority Data

Jun. 16, 2017  (CN) .......................... 201710461553.0

(51) Int. Cl.
| | | |
|---|---|---|
| *H04W 68/10* | (2009.01) | |
| *H04W 68/00* | (2009.01) | |
| *H04W 76/14* | (2018.01) | |
| *H04W 68/02* | (2009.01) | |
| *H04W 76/28* | (2018.01) | |

(52) U.S. Cl.
CPC ......... *H04W 68/10* (2013.01); *H04W 68/005* (2013.01); *H04W 68/02* (2013.01); *H04W 76/14* (2018.02); *H04W 76/28* (2018.02)

(58) Field of Classification Search
None
See application file for complete search history.

(56) References Cited

U.S. PATENT DOCUMENTS

| | | | | |
|---|---|---|---|---|
| 10,652,856 B2* | 5/2020 | Åström | ............... | H04L 27/2602 |
| 10,805,136 B2* | 10/2020 | Abedini | ............. | H04L 27/2662 |
| 2008/0188247 A1* | 8/2008 | Worrall | ............... | H04W 68/025 |
| | | | | 455/458 |
| 2015/0098381 A1* | 4/2015 | Cucala Garcia | .. | H04W 52/0216 |
| | | | | 370/311 |
| 2016/0007316 A1* | 1/2016 | Vaidya | ................. | H04W 68/02 |
| | | | | 370/312 |
| 2016/0338006 A1* | 11/2016 | Lee | ................... | H04W 52/0229 |
| 2018/0027522 A1* | 1/2018 | Lee | ........................ | H04W 68/02 |
| | | | | 370/336 |
| 2018/0220360 A1* | 8/2018 | Sheng | .................... | H04W 48/10 |
| 2018/0302182 A1* | 10/2018 | Ly | ........................ | H04L 5/0023 |

* cited by examiner

*Primary Examiner* — German Viana Di Prisco
(74) *Attorney, Agent, or Firm* — Cantor Colburn LLP

(57) ABSTRACT

Method, device, base station and user equipment for implementing paging monitoring are described. At a base station side, the method includes: grouping a user equipment in a cell controlled by the base station, and allocating a group identifier to each group; for each user equipment, transmitting the group identifier corresponding to the user equipment and a paging indicator monitoring occasion to the user equipment; transmitting a paging indicator to the user equipment currently required to be paged or scheduled. At a user equipment side, the method includes: receiving a group identifier and a paging indicator monitoring occasion transmitted from a base station; monitoring a paging indicator at the paging indicator monitoring occasion; starting to monitor paging control information, when it is monitored that the paging indicator contains the group identifier.

4 Claims, 3 Drawing Sheets

```
┌─────────────────────────────────────────────────────────────────────┐
│ grouping user equipment in a cell controlled by the base station,   │──S11
│ and allocating a group identifier to each group                     │
└─────────────────────────────────────────────────────────────────────┘
                                  │
                                  ▼
┌─────────────────────────────────────────────────────────────────────┐
│ For each use equipment, transmitting the group identifier           │──S12
│ corresponding to the group and a paging indicator monitoring        │
│ timing to the user equipment                                        │
└─────────────────────────────────────────────────────────────────────┘
                                  │
                                  ▼
┌─────────────────────────────────────────────────────────────────────┐
│ transmitting a paging indicator to the user equipment currently     │
│ required to be paged or scheduled, wherein the paging indicator     │──S13
│ carries the group identifier of the paged user equipment required   │
│ to be paged or scheduled, so that the user equipment monitors       │
│ paging control information according to the paging indicator        │
└─────────────────────────────────────────────────────────────────────┘
```

METHOD AND DEVICE FOR IMPLEMENTING PAGING MONITORING, BASE STATION AND USER EQUIPMENT

CROSS-REFERENCE TO RELATED APPLICATIONS

This application claims the benefit of priority to Chinese Patent Application No. 201710461553.0, filed on Jun. 16, 2017, the entire disclosure of which are incorporated herein by reference.

TECHNICAL FIELD

The present disclosure relates to the field of wireless communication technology, and more particularly, to a method and a device for implementing a paging monitoring, a base station and a user equipment.

BACKGROUND

In a 5G New Radio (NR) system, a Synchronization Signal (SS) and a Physical Broadcast Channel (PBCH) are transmitted in a form of a Synchronization Signal Block (SS-block), and a beam sweeping function is introduced. A Primary Synchronization Signal (PSS), a Second Synchronization Signal (SSS) and a physical broad cast channel are disposed in the synchronization signal block. Each synchronization signal block may be seen as resource for a beam (analog domain) during the beam sweeping. A plurality of synchronization signal blocks constitute a Synchronization Signal burst (SS-burst), and the synchronization signal burst may be seen as relatively concentrated resources containing a plurality of beams. A plurality of synchronization signal bursts constitute a Synchronization Signal burst set (SS-burst-set). A beam sweeping process is repeatedly transmitting the synchronization signal block on different beams, and through the training of the beam sweeping, a user equipment may know which beam receives the strongest signal.

In a 5G system, which is similar with LTE, a paging needs functions that supporting to inform a call coming, and supporting to inform a SI update and so forth. The paging contains two parts: paging control information and a paging message. Moreover, the paging message is scheduled by paging control information in Downlink Control Information (DCI) carried on a Physical Downlink Control Channel (PDCCH), and the paging message is transmitted on the scheduled Physical Downlink Shared Channel (PDSCH). A search space for the PDCCH that schedules the paging message is configured by a network side. Generally speaking, the user equipment needs to monitor paging control information on the PDCCH at certain moments. If paging control information indicates that a paging message to be sent on some time-frequency resources on the PDSCH, the user equipment decodes the paging message on those time-frequency resources, to obtain call coming information or SI update information.

In a process for implementing the present disclosure, the inventors found that the prior art at least has the following technical problems.

During conducting a paging monitoring, a user equipment needs to directly monitor paging control information delivered by a base station, which has high blind detection complexity and low paging monitoring efficiency.

SUMMARY

The present disclosure provides a method and a device for implementing a paging monitoring, a base station and a user equipment, to improve efficiency of the paging monitoring.

In some embodiment of the present disclosure, a method for implementing a paging monitoring is provided, and the method is applied in a base station, including:
grouping user equipment in a cell controlled by the base station, and allocating a group identifier to each group; for each user equipment, transmitting the group identifier corresponding to the user equipment and a paging indicator monitoring occasion to the user equipment; and transmitting a paging indicator to the user equipment currently required to be paged or scheduled, wherein the paging indicator carries the group identifier of the user equipment required to be paged or scheduled, so that the user equipment monitors paging control information according to the paging indicator.

In some embodiment, grouping the user equipment in the cell controlled by the base station includes: grouping the user equipment in a connected state and the user equipment in an idle state or an inactive state respectively.

In some embodiment, for each user equipment in the connected state, transmitting the group identifier corresponding to the user equipment and a paging indicator monitoring occasion to the user equipment includes: for each user equipment, transmitting the group identifier corresponding to the user equipment and the paging indicator monitoring occasion to the user equipment through a system message, a radio resource control signaling or a downlink control signaling; for each user equipment in the idle state or the inactive state, transmitting the group identifier corresponding to the user equipment and a paging indicator monitoring occasion to the user equipment includes: for each user equipment, transmitting the group identifier corresponding to the user equipment and the paging indicator monitoring occasion to the user equipment through a system message.

In some embodiment, time-frequency resources occupied by the paging indicator are predetermined or configured by remaining minimum system information.

In some embodiment, time-frequency resources occupied by the paging indicator include: frequency resources not occupied by a primary synchronization signal or a secondary synchronization signal on an OFDM (Orthogonal Frequency Division Multiplexing) symbol and a PBCH (Physical Broadcast Channel) bandwidth where the primary synchronization signal or the secondary synchronization signal is located; or, n symbols before the OFDM symbol where the primary synchronization signal or the secondary synchronization signal is located and a bandwidth where the primary synchronization signal or the secondary synchronization signal is located, wherein $n>=1$, $n<=4$, and n is an integer; or, n symbols before the OFDM symbol where the primary synchronization signal or the secondary synchronization signal is located and a bandwidth where the PBCH is located, wherein $n>=1$, $n<=4$, and n is an integer.

In embodiments of the present disclosure, a method for implementing a paging monitoring is provided, the method is applied in a user equipment, and the method includes: receiving a group identifier and a paging indicator monitoring occasion transmitted from a base station; monitoring a paging indicator at the paging indicator monitoring occasion; and starting to monitor paging control information, when it is monitored that the paging indicator contains the group identifier corresponding to the user equipment.

In some embodiment, when it is monitored that the paging indicator contains the group identifier corresponding to the user equipment, the method further includes: transmitting a best downlink beam index monitored by the user equipment to the base station.

In some embodiment of the present disclosure, a device for implementing a paging monitoring is provided, and the device is located in a base station, and including: a grouping circuitry, configured to group user equipment in a cell controlled by the base station, and allocating a group identifier to each group; a first transmission circuitry, configured to: for each user equipment, transmit the group identifier corresponding to the user equipment and a paging indicator monitoring occasion to the user equipment; a second transmission circuitry, configured to transmit a paging indicator to the user equipment currently required to be paged or scheduled, wherein the paging indicator carries the group identifier of the user equipment required to be paged or scheduled, so that the user equipment monitors paging control information according to the paging indicator.

In some embodiment, the grouping circuitry, configured to group the user equipment in a connected state and the user equipment in an idle state or an inactive state respectively.

In some embodiment, for the user equipment in the connected state, the first transmission circuitry, configured to transmit the group identifier corresponding to each user equipment and the paging indicator monitoring occasion to each user equipment through a system message, a radio resource control signaling or a downlink control information signaling; for each user equipment in the idle state or the inactive state, the first transmission circuitry, configured to transmit the group identifier corresponding to the user equipment and the paging indicator monitoring occasion to the user equipment through a system message.

In some embodiment, time-frequency resources occupied by the paging indicator are predetermined or configured by remaining minimum system information.

In some embodiment, time-frequency resources occupied by the paging indicator include: frequency resources not occupied by a primary synchronization signal or a secondary synchronization signal on an OFDM (Orthogonal Frequency Division Multiplexing) symbol and a PBCH (Physical Broadcast Channel) bandwidth where the primary synchronization signal or the secondary synchronization signal is located; or, n symbols before the OFDM symbol where the primary synchronization signal or the secondary synchronization signal is located and a bandwidth where the primary synchronization signal or the secondary synchronization signal is located, wherein n>=1, n<=4, and n is an integer; or, n symbols before the OFDM symbol where the primary synchronization signal or the secondary synchronization signal is located and a bandwidth where the PBCH is located, wherein n>=1, n<=4, and n is an integer.

In some embodiment of the present disclosure, a device for implementing paging monitoring is provided, and the device is located in a user equipment, and the device includes: a receiving circuitry, configured to receive a group identifier and a paging indicator monitoring occasion transmitted from a base station; a first monitoring circuitry, configured to monitor a paging indicator at the paging indicator monitoring occasion; a second monitoring circuitry, configured to start to monitor paging control information, when it is monitored that the paging indicator contains the group identifier corresponding to the user equipment.

In some embodiment, the device further includes: a third transmission circuitry, configured to transmit a best downlink beam index monitored by the user equipment to the base station, when it is monitored that the paging indicator contains the group identifier corresponding to the user equipment.

In embodiments of the present disclosure, a base station is provided, and the base station includes a device for implementing a paging monitoring at a base station side, wherein the device includes: a grouping circuitry, configured to group user equipment in a cell controlled by the base station, and allocating a group identifier to each group; a first transmission circuitry, configured to: for each user equipment, transmit the group identifier corresponding to the user equipment and a paging indicator monitoring occasion to the user equipment; a second transmission circuitry, configured to transmit a paging indicator to the user equipment currently required to be paged or scheduled, wherein the paging indicator carries the group identifier of the user equipment required to be paged or scheduled, so that the user equipment monitors paging control information according to the paging indicator.

In embodiments of the present disclosure, a user equipment is provided, and the user equipment includes a device for implementing a paging monitoring at a user equipment side, wherein the device includes: a receiving circuitry, configured to receive a group identifier and a paging indicator monitoring occasion transmitted from a base station; a first monitoring circuitry, configured to monitor a paging indicator at the paging indicator monitoring occasion; a second monitoring circuitry, configured to start to monitor paging control information, when it is monitored that the paging indicator contains the group identifier corresponding to the user equipment.

In embodiments of the present disclosure, a method, a device, a base station and a user equipment for implementing a paging monitoring are provided. The base station groups user equipment in a cell controlled by the base station, and for each user equipment, transmits the group identifier corresponding to the user equipment and a paging indicator monitoring occasion to the user equipment, and transmits a paging indicator carrying the group identifier of the paged user equipment to the user equipment. After receiving the group identifier and the paging indicator monitoring occasion from the base station, the user equipment monitors a paging indicator at the paging indicator monitoring occasion; and the user equipment starts to monitor paging control information, when it is monitored that the paging indicator contains the group identifier corresponding to the user equipment. Compared with the prior arts, the present disclosure may reduce blind detection complexity of the user equipment and improve efficiency of the paging monitoring.

DETAILED DESCRIPTION

In order to make objectives, technical solutions and advantages of embodiments of the present disclosure more clear, embodiments of the present disclosure are clearly and completely described in the following, combining with the drawings in embodiments of the present disclosure. Apparently, the described embodiments are only a part but not all of the embodiments of the present disclosure. All other embodiments obtain by those skilled in the art based on the embodiments of the present disclosure without creative efforts shall fall within the protection scope of the present disclosure.

Figure 1:
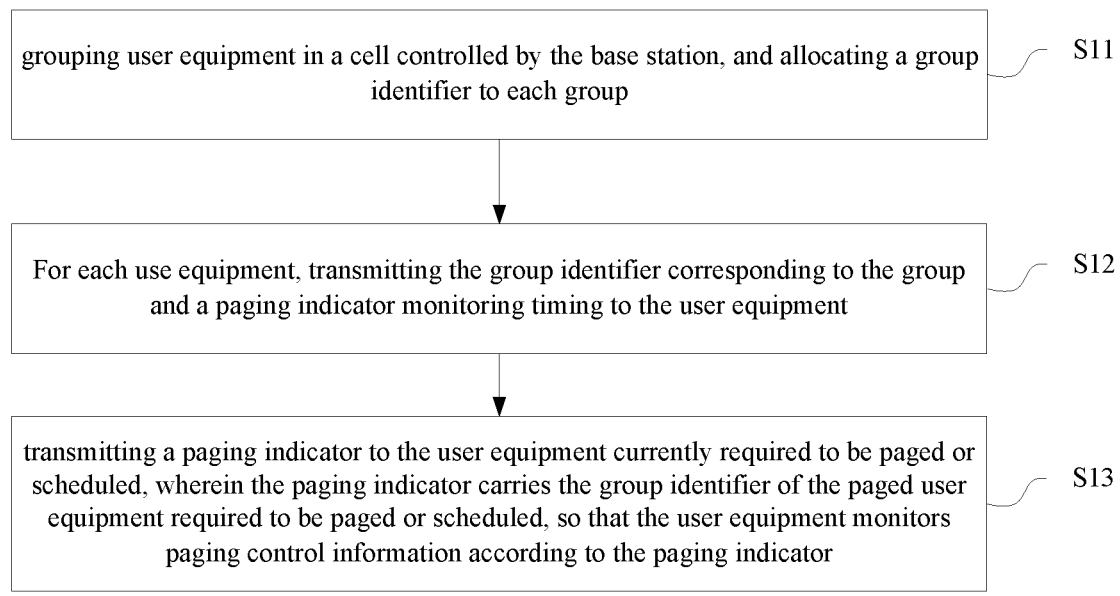
FIG. 1 schematically illustrates a flow diagram of a method for implementing a paging monitoring according to an embodiment of the present disclosure.

In embodiments of the present disclosure, a method for implementing a paging monitoring is provided, and the method is applied in a base station. As shown in FIG. 1, the method includes S11, S12 and S13.

In S11, a user equipment in a cell controlled by the base station is grouped, and a group identifier is allocated to each group.

In some embodiment, the base station groups the user equipment in a connected state and the user equipment in an idle state or an inactive state respectively.

For the user equipment in the connected state, the base station may equally allocate the user equipment to each group according to the maximum number of groups that can be indicated and a number of the currently connected user equipment.

For user equipment in the idle state or the inactive state, the base station does not know which user equipment resides in one cell. In this case, the base station may roughly determine which user equipment resides in the cell according to a Track Area Update (TAU) reported by the user equipment, and then equally allocate the user equipment to each group according to the maximum number of groups that can be indicated and the unique identifier of each user equipment.

The group identifier may be an index, an ID or a serial number, but not limited thereto.

In S12, for each user equipment, the group identifier corresponding to each group and a paging indicator monitoring occasion are transmitted to the user equipment.

In some embodiment, for each user equipment in the connected state, the base station may transmit the group identifier corresponding to the user equipment and the paging indicator monitoring occasion to the user equipment through a system message, a radio resource control signaling or a downlink control information signaling; for each user equipment in the idle state or the inactive state, the base station may transmit the group identifier corresponding to the user equipment and the paging indicator monitoring occasion to the user equipment through a system message.

In S13, a paging indicator is transmitted to the user equipment currently required to be paged or scheduled, wherein the paging indicator carries the group identifier of the user equipment required to be paged or scheduled, so that the user equipment monitors paging control information according to the paging indicator.

A structure of PDCCH used by the paging indicator, which may be conducted a blind detection by the user equipment. The RNTI (Radio Network Temporary Identifier) used by the paging indicator is a new RNTI, which differs from a RNTI for scheduling a RMSI (Remaining Minimum System Information) message, and further differs from a RNTI for scheduling a paging message, and further differs from a RNTI for scheduling a RAR (Random Access Response), and further differs from a C-RNTI (Cell Radio Network Temporary Identifier).

Time-frequency resources for the paging indicator may be predetermined or may be configured by remaining minimum system information.

Time-frequency resources for the paging indicator may include: frequency resources being not occupied by a primary synchronization signal or a secondary synchronization signal on an OFDM symbol and a PBCH bandwidth where the primary synchronization signal or the secondary synchronization signal is located. So that after the user equipment wakes up in DRX (Discontinuous Reception), it only needs to process a resource element within a rectangular time-frequency resource block constituted by the PSS/SSS/PBCH (synchronization signal block) and the paging indicator, and conduct a paging indicator detection during measuring the synchronization signal block for a beam training.

Alternatively, time-frequency resource for the paging indicator may further include: n symbols before the OFDM symbol where the PSS/SSS is located, and a bandwidth where the PSS/SSS is located, wherein $n>=1$, $n<=4$, and n is an integer. Accordingly, after the user equipment wakes up in DRX, it only needs to open the bandwidth of the PSS/SSS, and conduct a paging indicator detection during measuring the synchronization signal block for a beam training.

Alternatively, time-frequency resources for the paging indicator may further include: n symbols before the OFDM symbol where the PSS/SSS is located, and the bandwidth where the PBCH is located, wherein $n>=1$, $n<=4$, and n is an integer. After the user equipment wakes up in DRX, it needs to open the bandwidth of the PBCH. After the paging indicator is detected, if the user equipment finds that system information is updated, it can directly decode the PBCH, and the bandwidth of paging control information may further be the PBCH bandwidth. Accordingly, the user equipment can monitor paging control information.

There is an association relation between a paging indicator and synchronization signal block. The paging indicator and synchronization signal block which have an association relationship may share the same antenna port, or have a quasi-co-located relation.

In embodiments of the present disclosure, the method for implementing a paging monitoring is provided, which groups the user equipment in a cell controlled by the base station, and for each user equipment, transmits the group identifier corresponding to the group and the paging indicator monitoring occasion to the user equipment, and then transmits the paging indicator carrying the group identifier of the paged user equipment to the user equipment, so that the user equipment monitors paging control information according to the group indicator. Compared with the prior art, embodiments of the present disclosure may reduce blind detection complexity of the user equipment and improve efficiency of the paging monitoring.

Figure 2:
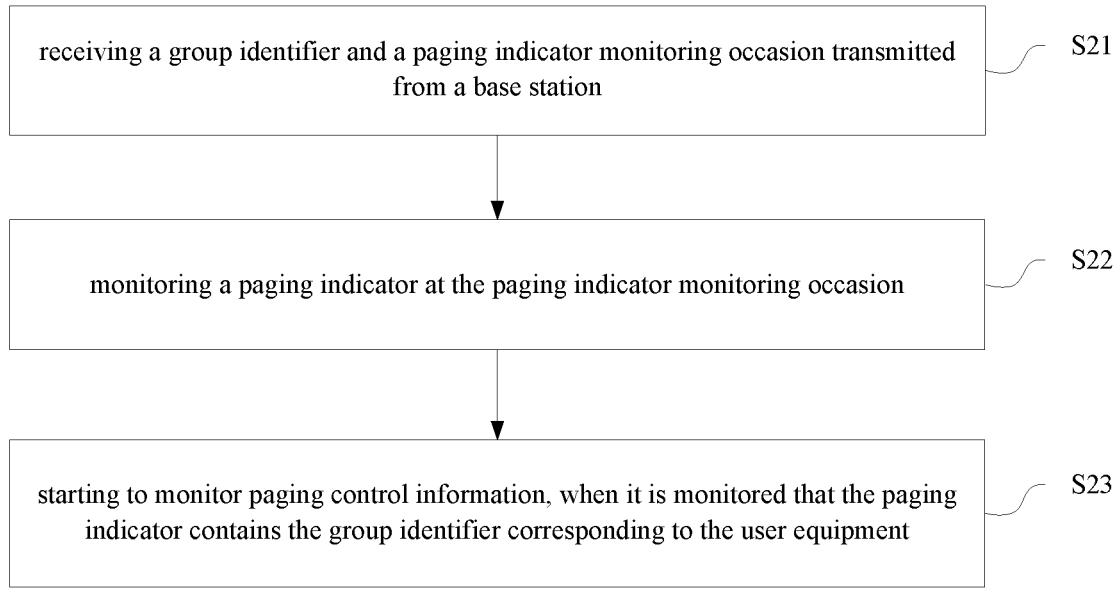
FIG. 2 schematically illustrates a flow diagram of a method for implementing a paging monitoring according to another embodiment of the present disclosure.

In embodiments of the present disclosure, another method for implementing a paging monitoring is provided, and the method is applied in a user equipment, as shown in FIG. 2, and the method includes S21, S22 and S23.

In S21, a group identifier and a paging indicator monitoring occasion transmitted from a base station are received.

The group identifier may be an index, an ID or a number, which is not limited.

In S22, a paging indicator at the paging indicator monitoring occasion is monitored.

In some embodiment, after waking up in DRX, the user equipment monitors a paging indicator at the paging indicator monitoring occasion.

In S23, paging control information is started to monitor, when it is monitored that the paging indicator contains the corresponding group identifier.

If the monitored paging control information indicates that a paging message is sent on some time-frequency resources on the PDSCH, the user equipment decodes the paging message on those time-frequency resources, to obtain the call coming information or the SI update information.

Further, if the base station determines that a user equipment enters a beam failure, the base station needs to trigger the user equipment to report the best downlink beam index to the base station. Accordingly, after monitoring that the paging indicator includes the group identifier corresponding to the user equipment, the user equipment transmits the best downlink beam index (namely the best synchronization signal block index) monitored by the user equipment to the base station; and after receiving this information, the base station knows the best downlink beam where the user equipment resides.

Further, the user equipment may also soft combine a plurality of paging indicators and decode, to obtain a high gain.

In embodiments of the present disclosure, the method for implementing a paging monitoring is provided, which receives a group identifier and a paging indicator monitoring occasion transmitted from a base station, and monitors a paging indicator at the paging indicator monitoring occasion, and starts to monitor paging control information, when it is monitored that the paging indicator contains the group identifier corresponding to the user equipment. Compared with the prior art, the present disclosure may reduce blind detection complexity of the user equipment and improve efficiency of the paging monitoring.

Figure 3:
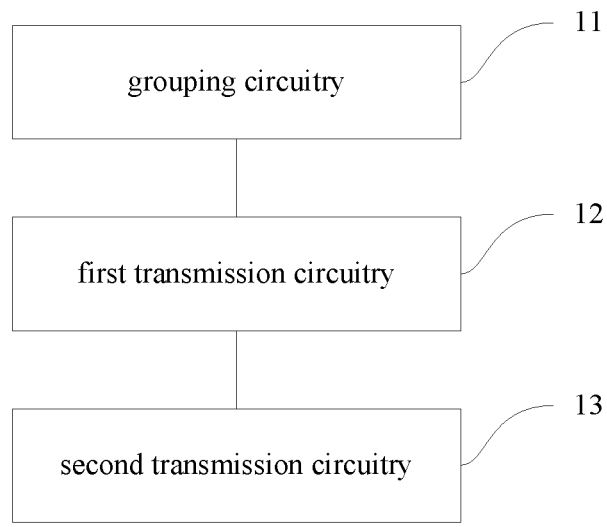
FIG. 3 schematically illustrates a structural diagram of a device for implementing a paging monitoring according to an embodiment of the present disclosure.

In embodiments of the present disclosure, a device for implementing a paging monitoring is further provided, and the device is applied in a base station, as shown in FIG. 3, and the device includes: a group circuitry 11, configured to group user equipment in a cell controlled by the base station, and allocating a group identifier to each group; a first transmission circuitry 12, configured to: for each user equipment, transmit the group identifier corresponding to the user equipment and a paging indicator monitoring occasion to the user equipment; a second transmission circuitry 13, configured to transmit a paging indicator to the user equipment currently required to be paged or scheduled, wherein the paging indicator carries the group identifier of the user equipment required to be paged or scheduled, so that the user equipment monitors paging control information according to the paging indicator.

In embodiments of the present disclosure, the device for implementing a paging monitoring is provided, which groups the user equipment in a cell controlled by the base station, and for each user equipment, transmits the group identifier corresponding to each group and the paging indicator monitoring occasion to user equipment, and then transmits the paging indicator carrying the group identifier of the user equipment to the paged user equipment, so that the user equipment monitors paging control information according to the group identifier. Compared with the prior arts, the present disclosure may reduce blind detection complexity of the user equipment and improve efficiency of the paging monitoring.

In some embodiment, a group circuitry 11, configured to group the user equipment in a connected state and the user equipment in an idle state or an inactive state respectively.

In some embodiment, for each user equipment in the connected state, the first transmission circuitry 12, configured to transmit the group identifier corresponding to the user equipment and the paging indicator monitoring occasion to the user equipment through a system message, a radio resource control signaling or a downlink control signaling; for each user equipment in the idle state or the inactive state, the first transmission circuitry 12, configured to transmit the group identifier corresponding to the user equipment and the paging indicator monitoring occasion to the user equipment through a system message.

In some embodiment, time-frequency resources occupied by the paging indicator are predetermined or configured by remaining minimum system information.

In some embodiment, time-frequency resources occupied by the paging indicator include: frequency resources not occupied by a primary synchronization signal or a secondary synchronization signal on an OFDM symbol and a PBCH bandwidth where the primary synchronization signal or the secondary synchronization signal is located; or, n symbols before the OFDM symbol where the primary synchronization signal or the secondary synchronization signal is located and a bandwidth where the primary synchronization signal or the secondary synchronization signal is located, wherein $n>=1$, $n<=4$, and n is an integer; or, n symbols before the OFDM symbol where the primary synchronization signal or the secondary synchronization signal is located and a bandwidth where the PBCH is located, wherein $n>=1$, $n<=4$, and n is an integer.

In some embodiment, the device may be configured to conduct the technical solution in the method embodiment corresponding to FIG. 1, and its implementation principles and technical effects are similar with the method, and are not described in detail here.

Figure 4:
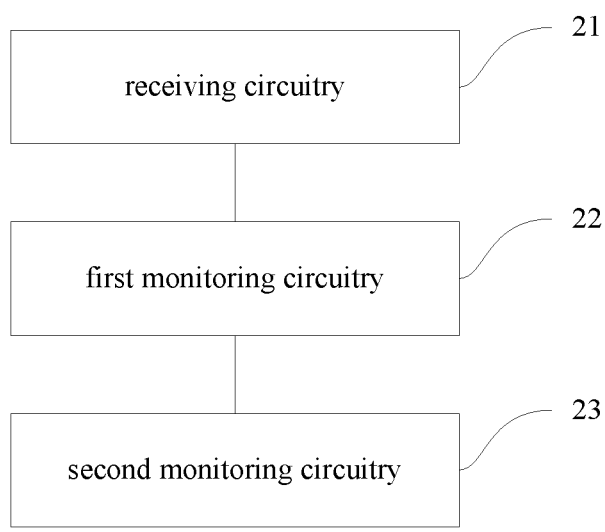
FIG. 4 schematically illustrates a structural diagram of a device for implementing a paging monitoring according to another embodiment of the present disclosure.

In embodiments of the present disclosure, another device for implementing a paging monitoring is further provided, and the device is applied in a user equipment, as shown in FIG. 4, and the device includes: a receiving circuitry 21, configured to receive a group identifier and a paging indicator monitoring occasion transmitted from a base station; a first monitoring circuitry 22, configured to monitor a paging indicator at the paging indicator monitoring occasion; a second monitoring circuitry 23, configured to start to monitor paging control information, when it is monitored that the paging indicator contains the group identifier corresponding to the user equipment.

In embodiments of the present disclosure, the method for implementing a paging monitoring is provided, which receives a group identifier and a paging indicator monitoring occasion transmitted from a base station, and monitors a paging indicator at the paging indicator monitoring occasion, and starts to monitor paging control information, when it is monitored that the paging indicator contains the group identifier corresponding to the user equipment. Compared with the prior arts, the present disclosure may reduce blind detection complexity of the user equipment and improve efficiency of the paging monitoring.

In some embodiment, the device further includes: a third transmission circuitry, configured to transmit a best downlink beam index monitored by the user equipment to the base station, when it is monitored that the paging indicator contains the group identifier corresponding to the user equipment.

In some embodiment, the device may be configured to conduct the technical solution in the method embodiment corresponding to FIG. 2, and its implementation principles and technical effects are similar with the method, and are not described in detail here.

In embodiments of the present disclosure, a base station is further provided, and the base station includes a device for implementing a paging monitoring at a base station side.

In embodiments of the present disclosure, a user equipment is further provided, and the user equipment includes a device for implementing a paging monitoring at a user equipment side.

It needs to be clarified that the term "paging indicator" mentioned in the embodiments of the present disclosure refers to all signals, channels or related mechanism capable of indicating paging or indicating scheduling. Certainly, other terms may further be applied to represent signals, channels or related mechanism capable of indicating paging or indicating scheduling. Any replacement of the term "paging indicator" based on the embodiments in the present disclosure shall fall into the protection scope of the present disclosure.

All or part of steps of above methods may be completed by relevant hardware once the program instruction are executed, and the program may be storage in a computer readable storage medium, such as a Read-Only memory (ROM), a Random Access Memory (RAM), a magnetic disk or an optical disk.

What is claimed is:

1. A method for implementing a paging monitoring, being applied in a base station and comprising:
    grouping user equipment in a cell controlled by the base station, and allocating a group identifier to each group;
    for each user equipment, transmitting the group identifier corresponding to the user equipment and a paging indicator monitoring occasion to the user equipment; and
    transmitting a paging indicator to the user equipment currently required to be paged or scheduled, wherein the paging indicator carries the group identifier of the user equipment required to be paged or scheduled, so that the user equipment monitors paging control information according to the paging indicator,
    wherein the paging indicator is confined within n symbols before an OFDM (Orthogonal Frequency Division Multiplexing) symbol where the primary synchronization signal or the secondary synchronization signal is located and a bandwidth where the primary synchronization signal or the secondary synchronization signal is located.

2. The method according to claim 1, wherein grouping the user equipment in the cell controlled by the base station comprises: grouping the user equipment in a connected state and the user equipment in an idle state or an inactive state respectively.

3. The method according to claim 2, wherein, for each user equipment in the connected state, transmitting the group identifier corresponding to the user equipment and a paging indicator monitoring occasion to the user equipment comprises: for each user equipment, transmitting the group identifier corresponding to the user equipment and the paging indicator monitoring occasion to the user equipment through a system message, a radio resource control signaling or a downlink control signaling; and
    for each user equipment in the idle state or the inactive state, transmitting the group identifier corresponding to the user equipment and a paging indicator monitoring occasion to the user equipment comprises: for each user equipment, transmitting the group identifier corresponding to the user equipment and the paging indicator monitoring occasion to the user equipment through a system message.

4. A base station, comprising a device for implementing a paging monitoring, wherein the device comprises:
    a grouping circuitry, configured to group user equipment in a cell controlled by the base station, and allocating a group identifier to each group;
    a first transmission circuitry, configured to: for each user equipment, transmit the group identifier corresponding to the user equipment and a paging indicator monitoring occasion to the user equipment; and
    a second transmission circuitry, configured to transmit a paging indicator to the user equipment currently required to be paged or scheduled, wherein the paging indicator carries the group identifier of the user equipment required to be paged or scheduled, so that the user equipment monitors paging control information according to the paging indicator,
    wherein the paging indicator is confined within n symbols before an OFDM (Orthogonal Frequency Division Multiplexing) symbol where the primary synchronization signal or the secondary synchronization signal is located and a bandwidth where the primary synchronization signal or the secondary synchronization signal is located.

* * * * *